(12) United States Patent
Tschirner et al.

(10) Patent No.: US 6,211,289 B1
(45) Date of Patent: Apr. 3, 2001

(54) MODIFIED POLYVINYLACETALS WITH LOW SOLUTION VISCOSITY

(75) Inventors: Peter Tschirner, Emmerting; Peter Heiling; Otto-Sebastian Huber, both of Burghausen; Guenter Braunsperger, Kirchdorf; Klaus Haefner, Marktl; Georg Friedl, Burghausen, all of (DE)

(73) Assignee: Wacker Chemie GmbH, Munich (DE)

( * ) Notice: Subject to any disclaimer, the term of this patent is extended or adjusted under 35 U.S.C. 154(b) by 0 days.

(21) Appl. No.: 09/194,143

(22) PCT Filed: Oct. 2, 1997

(86) PCT No.: PCT/EP97/05423

§ 371 Date: Nov. 25, 1998

§ 102(e) Date: Nov. 25, 1998

(87) PCT Pub. No.: WO98/15582

PCT Pub. Date: Apr. 16, 1998

(30) Foreign Application Priority Data

Oct. 4, 1996 (DE) .............................. 196 41 064

(51) Int. Cl.⁷ ...................................... C08F 8/00
(52) U.S. Cl. ............................ 525/61; 523/400; 523/437; 524/503; 524/557; 525/58; 525/60
(58) Field of Search ..................... 524/503, 557; 523/400, 437; 525/58, 60, 61

(56) References Cited

U.S. PATENT DOCUMENTS

| | | | |
|---|---|---|---|
| 4,130,539 | 12/1978 | Wegmann . | |
| 4,329,383 | * 5/1982 | Joh | 428/36 |
| 4,879,336 | * 11/1989 | Schilling et al. | 524/503 |
| 4,997,870 | * 3/1991 | Schilling et al. | 524/423 |
| 5,118,751 | * 6/1992 | Schulze et al. | 524/503 |
| 5,187,226 | * 2/1993 | Kamachi et al. | 525/56 |
| 5,236,999 | 8/1993 | Kroggel . | |

FOREIGN PATENT DOCUMENTS

| | | |
|---|---|---|
| 2643076 | 4/1977 | (DE) . |
| 3932027 | 4/1991 | (DE) . |
| 0368832 | 5/1990 | (EP) . |
| 0461399 | 12/1991 | (EP) . |
| 0505939 | 9/1992 | (EP) . |

OTHER PUBLICATIONS

Derwent Abstract corresponding to DE 3932027 A1 AN 91–095470.

* cited by examiner

Primary Examiner—Judy M. Reddick
(74) Attorney, Agent, or Firm—Burgess, Ryan & Wayne; Milton J. Wayne; William R. Moran

(57) ABSTRACT

Modified polyvinyl acetals are prepared by saponification of 1-alkylvinyl acetate-vinyl acetate copolymers, which contain 1-alkylvinyl acetate/vinyl acetate in a weight ratio of 1/99–40/60 and subsequent acetalization the saponification products containing at least 80% units of vinyl alcohol and 1-alkyl vinyl alcohol with one or more aliphatic aldehydes with 1–6 C atoms under acid catalysis in an aqueous and/or organic medium; as well as to a method for the manufacture and the use thereof, especially in printing inks.

12 Claims, No Drawings

MODIFIED POLYVINYLACETALS WITH LOW SOLUTION VISCOSITY

BACKGROUND OF THE INVENTION

1) Field of the Invention

The invention relates to modified polvinyl acetals, a process for their preparation and their use.

2) Background Art

The preparation of polyvinyl acetals from the corresponding polyvinyl alcohols by polymer-analogous reaction with the corresponding aldehydes has been known since 1924, and many aldehydes have been used for preparing the corresponding polyvinyl acetals since then. Polyvinyl acetals are prepared in a three-stage process (polyvinyl acetate → polyvinyl alcohol → polyvinyl acetal), resulting in products which contain not only vinyl acetal groups but also vinyl alcohol and vinyl acetate units. In the following, modified polyvinyl acetals are those which contain further units in addition to the three units mentioned above. In particular, polyvinyl formal, polyvinyl acetal and polvinyl butyral have achieved commercial importance.

The largest application area for polyvinyl acetals is the production of safety glass for automobile construction and in architecture, where plasticized polyvinyl butyral films are used as intermediate layers in panes of glass. Modified polyvinyl butyrals have also been proposed for this application, for example the polyvinyl butyrals containing sulfonate groups described in EP-A-368832.

Polvinyl butyrals modified with amino groups are known from EP-A 461399. These are used as precipitants.

A further application area for polyvinyl butyrals is their use in anticorrosion coatings. For this purpose, EP-A 505939 (U.S. Pat. No. 5,236,999) proposes the use of modified polyvinyl butyrals which are crosslinkable due to the acetal functions derived from aldehydes containing keto groups.

Owing to, inter alia, their good pigment binding power, polyvinyl butyrals are also used as binders in surface coatings and specifically in printing inks. This application requires that the organic solutions of the polyvinyl butyrals should have a solution viscosity which is as low as possible in order to be able to produce inks having a high solids content at as high a binder content as possible.

In the prior art, the solution viscosity of polyvinyl butyral is regulated via the molecular weight by using polyvinyl acetates having a low molecular weight or degree of polymerization as starting materials for preparing the polyvinyl butyral. The use of low molecular weight polvinyl butyrals as carrier material in pigment preparations for printing inks is described, for example, in DE-B 2643076 (U.S. Pat. No. 4,130,539). A disadvantage here is that considerable problems arise in the preparation of low molecular weight polyvinyl butyrals by acetal formation from low molecular weight polvinyl alcohols, since solutions of low molecular weight, fully saponified polyvinyl alcohols tend, inter alia, to gel and therefore have to be handled at temperatures of at least 50° C.

SUMMARY OF THE INVENTION

It is an object of the invention to provide polyvinyl acetals which, at a comparable vinyl alcohol content in the polyvinyl acetal, generally from 10 to 28% by weight, and a comparable molecular weight compared with the polyvinyl alcohols used as starting materials, have a lower solution viscosity and higher storage stability than the polyvinyl acetals known hitherto.

It has surprisingly been found that polyvinyl acetals which are prepared by saponification and acetalization of copolymers containing vinyl acetate and 1-alkylvinyl acetate units have a significantly lower solution viscosity, for example in ethanol, than polyvinyl acetals which are prepared by acetalization of saponified polyvinyl acetate having a comparable vinyl alcohol content and molecular weight. In addition, aqueous solutions of such copolymeric polyvinyl alcohols have an unlimited shelf life at room temperature.

DESCRIPTION OF THE PREFERRED EMBODIMENTS

The invention provides modified polyvinyl acetals obtainable by saponification of 1-alkylvinyl acetate-vinyl acetate copolymers which comprise 1-alkylvinyl acetate/vinyl acetate in a weight ratio of from 1/99 to 40/60 and subsequent acetalization of the saponification products comprising at least 80% by weight of vinyl alcohol and 1-alkylvinyl alcohol units with one or more aliphatic aldehydes having from 1 to 6 carbon atoms in the presence of an acid catalyst in an aqueous and/or organic medium.

Examples of suitable aliphatic aldehydes having from 1 to 6 carbon atoms are formaldehyde, acetaldehyde, propionaldehyde and preferably butyraldehyde.

Suitable alkyl groups are $C_1$–$C_4$-radicals such as methyl, ethyl and n-propyl radicals; preference is given to the methyl group.

The modified polyvinyl acetals comprise
a) 50–89.5% by weight of vinyl acetal units

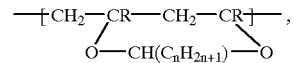

b) 10–30% by weight of vinyl alcohol units —[—$CH_2$—CR(OH)—]—,
c) 0.5–20% by weight of vinyl acetate units —[—$CH_2$—CR($OCOCH_3$)—]—,
where R is H or a $C_1$–$C_4$-alkyl radical and n is from 0 to 5 and the vinyl alcohol units b) and the vinyl acetate units c) comprise 1-alkylvinyl alcohol/vinyl alcohol and 1-alkylvinyl acetate/vinyl acetate in a weight ratio of from 1/99 to 40/60 in each case.

The most preferred polyvinyl acetals comprise from 55 to 89% by weight of vinyl acetal units a), from 10 to 25% by weight of vinyl alcohol units b) and from 1 to 20% by weight of vinyl acetate units c). The weight ratio of 1-alkylvinyl alcohol/vinyl alcohol and 1-alkylvinyl acetate/vinyl acetate is preferably from 10/90 to 20/80 in each case. Preferred vinyl acetal units are vinyl formal (n=0), vinyl acetal (n=1), vinyl propional (n=2) and, most preferably, vinyl butyral (n=3).

If desired, the polyvinyl acetals can further comprise from 1 to 5% by weight of additional monomer units. Examples of such units are carboxyl-functional comonomers such as acrylic acid, methacrylic acid and crotonic acid and amide-functional comonomer units such as acrylamide and methacrylamide.

The viscosity of the modified polyvinyl acetals (DIN 53015; Höppler method, 10% strength solution in ethanol) is from 6 to 600 mPas, preferably from 6 to 14 mPas.

The present invention further provides a process for preparing modified polyvinyl acetals by saponification of 1-alkylvinyl acetate-vinyl acetate copolymers which comprise 1-alkylvinyl acetate/vinyl acetate in a weight ratio of from 1/99 to 40/60, and subsequent acetalization of the saponification products comprising at least 80% by weight of vinyl alcohol and 1-alkylvinyl alcohol units with one or more aliphatic aldehydes having from 1 to 6 carbon atoms in the presence of an acid catalyst in an aqueous and/or organic medium.

To prepare the alkyl-modified polyvinyl acetals, use is made of partially or fully saponified vinyl acetate copolymers which contain at least 80% by weight of (1-alkyl)vinyl alcohol units. For the present purpose, fully saponified refers to polymers whose (1-alkyl)vinyl alcohol content is from 98 to 100% by weight. Suitable 1-alkylvinyl acetates are those containing saturated $C_1$–$C_4$-alkyl radicals. Preference is given to partially or fully saponified copolymers of 1-methylvinyl acetate (isopropenyl acetate) and vinyl acetate. Partially or fully saponified copolymers of 1-alkylvinyl acetate and vinyl acetate are known, for example, from DE-A 3932027 (Derwent Abstract AN 91-095470) as textile adhesives.

To prepare the partially or fully saponified vinyl acetate copolymers, vinyl acetate and 1-alkylvinyl acetate are copolymerized in the specified weight ratio of 1-alkylvinyl acetate/vinyl acetate of from 1/99 to 40/60, preferably from 10/90 to 20/80. If desired, from 1 to 5% by weight, based on the total weight of the comonomers, of further monomers such as comonomers containing carboxyl or amide groups can be copolymerized.

The polymerization is carried out in a known manner, preferably by bulk polymerization or by polymerization in organic solvents, particularly preferably in alcoholic solution. Suitable solvents and regulators are, for example, methanol, ethanol, propanol and isopropanol. The polymerization is carried out under reflux at a temperature of from 60 to 100° C. and initiated by addition of customary free-radical initiators. Examples of customary initiators are percarbonates such as cyclohexyl peroxydicarbonate. The molecular weight can be adjusted in a known manner by addition of regulators, by means of the solvent content, by varying the initiator concentration and by varying the temperature. Preference is given to setting a molecular weight (weight average $M_w$) of from 5000 to 100,000. After the polymerization is complete, the solvent and any excess monomer and regulator are distilled off.

The saponification of the (1-alkyl)vinyl acetate units is carried out in a manner known per se, for example by the belt or kneader process, under alkaline or acid conditions with addition of acid or base. The 1-alkylvinyl acetate-vinyl acetate copolymer is preferably taken up in alcohol, for example methanol, with the solids content being set to from 30 to 70%. The hydrolysis is preferably carried out under basic conditions, for example by addition of NaOH, KOH or $NaOCH_3$. The base is generally used in an amount of from 1 to 5 mol % based on acetate units. The hydrolysis is carried out at temperatures of from 30° C. to 60° C. After the hydrolysis is complete, the solvent is distilled off.

The partially or fully saponified 1-alkylvinyl acetate-vinyl acetate copolymers have a residual (1-alkyl)vinyl acetate content of from 0.5 to 20% by weight, preferably from 1 to 5% by weight, in each case based on the total weight of the copolymer. Preference is given to partially or fully saponified 1-methylvinyl acetate-vinyl acetate copolymers. The viscosity (DIN 53015, Höppler method, 4% strength solution in water) is from 1 to 30 mPas, preferably from 1 to 2.5 mPas, and serves as a measure of the molecular weight or of the degree of polymerization of the partially or fully saponified 1-alkylvinyl acetate-vinyl acetate copolymers.

For the acetalization, the partially or fully saponified 1-alkylvinyl acetate-vinyl acetate copolymers are preferably taken up in an aqueous medium. The solids content of the aqueous solution is usually set to from 5 to 30%. The acetalization is carried out in the presence of acid catalysts such as hydrochloric acid, sulfuric acid or phosphoric acid. The pH of the solution is preferably set to <1 by addition of 20% strength hydrochloric acid.

After addition of the catalyst, the solution is cooled to preferably from −10° C. to +30° C. and the acetalization reaction is started by addition of the aldehyde. Preferred aldehydes from the group consisting of aliphatic aldehydes having from 1 to 6 carbon atoms are formaldehyde, acetaldehyde, propionaldehyde and, most preferably, butyraldehyde. The amount added depends on the desired degree of acetalization. Since the acetalization proceeds to virtually complete conversion, the amount to be added can be determined by a simple stoichiometric calculation. After the addition of the aldehyde has been concluded, the acetalization is completed by warming the mixture to from 20° C. to 60° C. and stirring for a number of hours, preferably from 1 to 6 hours, and the pulverulent reaction product is isolated by filtration.

The process of the invention makes it possible to obtain polyvinyl acetals which, for the same molecular weight and the same OH number of the polyvinyl alcohols used as starting materials, have a significantly reduced solution viscosity compared with the previously known polyvinyl acetals. For example, the acetalization according to the prior art of polyvinyl alcohols having a viscosity (DIN 53015; Höppler method; 4% strength aqueous solution) of from 2 to 30 mPas results in polyvinyl butyrals having a viscosity (DIN 53015; Höppler method; 10% strength ethanolic solution) of from 15 to 1200 mPas. In contrast, the acetalization according to the present invention of 1-methylvinyl alcohol-vinyl alcohol copolymers having the same viscosity (DIN 53015; Höppler method; 4% strength aqueous solution) of from 2 to 30 mPas with butyraldehyde gives polyvinyl butyrals having a significantly reduced solution viscosity (DIN 53015; Höppler method; 10% strength ethanolic solution) of from 6 to 600 mPas. The alkyl-modified polyvinyl butyrals of the present invention thus make it possible for the first time to obtain polyvinyl butyral whose solution viscosity (DIN 53015; Höppler method; 10% strength by weight in ethanol) is <10 mPas.

As mentioned in the introduction, there is a need, especially in the printing ink industry, for binders having a solution viscosity which is as low as possible in order to be able to make available printing inks which have high solids contents at the same or higher binder content. Owing to the low intrinsic viscosity of solutions of the modified polyvinyl acetals of the invention, in particular polyvinyl butyrals, and the high storage stability of printing ink formulations produced therewith, they are particularly suitable for use in printing ink compositions.

When using the modified polyvinyl acetals of the invention in printing inks, it is possible to employ a higher binder content than when using a polyvinyl acetal according to the prior art while leaving the viscosity of the printing ink formulation unchanged. This leads to printing inks having a higher gloss owing to the higher binder content. Surprisingly, as shown in Table 2, it was also found that the modified polyvinyl acetals can also improve the storage stability (maintenance of a constant viscosity) of printing ink formulations.

Suitable printing ink formulations are known to those skilled in the art and generally comprise from 5 to 20% by weight of pigment, for example diazo or phthalocyanine pigments, from 5 to 15% of polyvinyl acetal binders and solvents, for example alcohols such as ethanol or esters such as ethyl acetate. If desired, further additives such as adhesion promoters, retarders, plasticizers and other additives such as fillers or waxes may also be present.

Further fields of application for the polyvinyl acetals modified according to the invention are those as binders in corrosion inhibitors, where advantages are the improved solubility in aromatic solvents and the lower emission of volatile organic compounds (VOC emission) owing to the lower binder requirement. The modified polyvinyl acetals are also suitable as binders in the ceramics industry, specifically as binders for ceramic green bodies. Also worth mentioning is the use as binders for ceramic powders and metal powders in injection molding (powder injection molding) and as binders for the internal coating of cans, if desired in combination with crosslinkers, such as epoxy resins.

The following examples serve to illustrate the invention:

EXAMPLE 1

In a 120 l reactor fitted with reflux condenser, metering-in devices and an anchor stirrer, 20 kg of a copolymer of vinyl acetate and isopropenyl acetate (80/20) having a Fikentscher K value of 27 were dissolved in 60 kg of methanol at 60° C. After everything had been dissolved, 800 ml of a 45% strength methanolic NaOH solution were metered in. After 2 hours, the pH was set to about 7 using concentrated acetic acid and the product which precipitated was filtered off with suction, washed with methanol and dried. Analyses on the product obtained: solids content 98.7%; residual acetate content: 2%; viscosity of a 4% strength aqueous solution by the Höppler method (DIN 53015): 2.3 mPas.

A 6 liter glass reactor was charged with 2715 ml of distilled water, 1114 ml of 20% strength HCl and 1172 ml of a 20% strength aqueous solution of the fully saponified 1-methylvinyl acetate-vinyl acetate copolymer. The initial charge was cooled to −4° C. over a period of 30 minutes and 182 ml of n-butyraldehyde, precooled to −4° C., were then added over a period of 3 minutes. The internal reactor temperature rose to 0° C. and the contents were cooled to −4° C. again within a few minutes. The initially clear mixture became milky immediately after the addition of aldehyde and the product precipitated after only 5–7 minutes. After a reaction time of one hour, the temperature was increased to 22° C. over a period of 3 hours and this temperature was held for a further 2 hours. The product was then filtered off with suction and washed with distilled water until the filtrate gave a neutral reaction. It was subsequently dried to a solids content of at least 98%, first at 22° C. and then at 40° C. under reduced pressure.

This gave a modified polyvinyl butyral containing 16.7% by weight of 1-methylvinyl alcohol/vinyl alcohol units, 2.0% by weight of 1-methylvinyl acetate/vinyl acetate units and 81.3% by weight of (methyl)vinyl butyral units. The viscosity (DIN 53015; Höppler method; 10% strength ethanolic solution) was 8.22 mPas.

Comparative Example 1

The procedure of Example 1 was repeated except that the polyvinyl alcohol used in the initial charge for the acetalization was a 20% strength aqueous solution of a fully saponified vinyl acetate homopolymer having a residual content of vinyl acetate units of 2% by weight and a viscosity (DIN 53015; Höppler method; 4% strength aqueous solution) of 2.1 mPas.

This gave a polyvinyl butyral containing 19.4% by weight of vinyl alcohol units, 2.0% by weight of vinyl acetate units and 78.6% by weight of vinyl butyral units. The viscosity (DIN 53015; Höppler method; 10% strength ethanolic solution) was 14.24 mPas.

EXAMPLE 2

The procedure of Example 1 was repeated except that the initial charge used for the acetalization consisted of 2173 ml of distilled water, 855 ml of 20% strength HCl and 1250 ml of a 20% strength aqueous solution of a fully saponified 1-methylvinyl acetate-vinyl acetate copolymer having a 1-methylvinyl acetate content of 10% by weight. The fully saponified copolymer had a residual content of 1-methylvinyl acetate or vinyl acetate units of 2% by weight and a viscosity (DIN 53015; Höppler method; 4% strength aqueous solution) of 5.5 mPas. The initial charge was cooled to 0° C. over a period of 30 minutes. The further procedure corresponded to that of Example 1.

This gave a polyvinyl butyral containing 17.4% by weight of 1-methylvinyl alcohol/vinyl alcohol units, 2.0% by weight of 1-methylvinyl acetate/vinylacetate units and 80.6% by weight of (methyl)vinyl butyral units. The viscosity (DIN 53015; Höppler method; 10% strength ethanolic solution) was 62.6 mPas.

Comparative Example 2

The procedure of Example 2 was repeated except that the polyvinyl alcohol used in the initial charge was a 20% strength aqueous solution of a fully saponified vinyl acetate homopolymer having a residual content of vinyl acetate units of 2% by weight and a viscosity (DIN 53015; Höppler method; 4% strength aqueous solution) of 5.6 mPas.

This gave a polyvinyl butyral containing 17.6% by weight of vinyl alcohol units, 2.0% by weight of vinyl acetate units and 80.4% by weight of vinyl butyral units. The viscosity (DIN 53015; Höppler method; 10% strength ethanolic solution) was 116 mPas.

Comparative Example 3

The procedure of Example 1 was repeated except that the polyvinyl alcohol used in the initial charge was a 20% strength aqueous solution of a fully saponified vinyl acetate homopolymer having a viscosity (DIN 53015; Höppler method; 4% strength aqueous solution) of 2.5 mPas.

This gave a polyvinyl butyral containing 18.4% by weight of vinyl alcohol units, 2.0% by weight of vinyl acetate units and 79.6% by weight of vinyl butyral units. The viscosity (DIN 53015; Höppler method; 10% strength ethanolic solution) was 18.9 mPas.

EXAMPLE 3

The procedure of Example 1 was repeated except that 237 ml of acetaldehyde were used for the acetalization. The precipitation temperature was 10° C. After two hours, the mixture was heated at 35° C. for 1 hour. It was then cooled to 20° C., filtered with suction and the product was washed until neutral.

This gave a polyvinyl acetal containing 10.9% by weight of 1-methylvinyl alcohol/vinyl alcohol units, 2.0% by weight of 1-methylvinyl acetate/vinyl acetate units and 87.1% by weight of vinyl acetal units. The viscosity (DIN 53015; Höppler method; 10% strength ethanolic solution) was 12 mPas.

Comparative Example 4

The procedure of Example 3 was repeated using a fully saponified vinyl acetate homopolymer having a viscosity (DIN 53015; Höppler method; 4% strength aqueous solution) of 2.5 mPas in the initial charge.

This gave a polyvinyl acetal containing 11.2% by weight of vinyl alcohol units, 2.0% by weight of vinyl acetate units and 86.8% by weight of vinyl acetal units. The viscosity (DIN 53015; Höppler method; 10% strength ethanolic solution) was 22.6 mPas.

EXAMPLE 4

The procedure of Example 1 was repeated except that 159 ml of propionaldehyde were used for the acetalization. The precipitation temperature was −6° C. After two hours, the mixture was heated to 22° C. It was then filtered with suction and the product was washed until neutral. This gave a polyvinyl propional containing 18% by weight of 1-methylvinyl alcohol/vinyl alcohol units, 2.0% by weight of 1-methylvinyl acetate/vinyl acetate units and 80% by weight of vinyl propional units. The viscosity (DIN 53105; Höppler method; 10% strength ethanolic solution) was 10 mPas.

Comparative Example 5

The procedure of Example 4 was repeated using a fully saponified vinyl acetate homopolymer having a viscosity (DIN 53015; Höppler method; 4% strength aqueous solution) of 2.5 mPas.

This gave a polyvinyl propional containing 19.3% weight of vinyl alcohol units, 2.0% by weight of vinyl acetate units and 78.7% by weight of vinyl propional units. The viscosity (DIN 53015; Höppler method; 10% strength ethanolic solution) was 15.9 mPas.

EXAMPLE 5

The procedure of Example 1 was repeated except that a copolymeric polyvinyl alcohol prepared by complete saponification of a copolymer of 1-methylvinyl acetate and vinyl acetate in a ratio of 10/90 was used.

EXAMPLE 6

The procedure of Example 1 was repeated except that a copolymeric polyvinyl alcohol prepared by complete saponification of a copolymer of 1-methylvinyl acetate and vinyl acetate in a ratio of 30/70 was used.

EXAMPLES 7 TO 12

The procedure of Example 1 was repeated using different amounts of butyraldehyde for the acetalization:

| Example | 7 | 8 | 9 | 10 | 11 | 12 |
|---|---|---|---|---|---|---|
| Amount of butyraldehyde [ml] | 200 | 190 | 180 | 170 | 160 | 150 |

The characterization of the starting materials and products of Examples 1 to 12 and Comparative Examples 1 to 5 is summarized in Table 3.

Methods of determination:

1. Determination of the dynamic viscosity of a solution of polyvinyl acetals (solution viscosity):

90.00±0.01 g of ethanol and 10.00±0.01 g of polyvinyl acetal were weighed into a 250 ml conical flask with ground glass stopper and completely dissolved at 50° C. in the shaker. The solution was subsequently cooled to 20° C. and the dynamic viscosity (DIN 53015; Höppler method) was determined at 20° C. using a ball 3.

2. Determination of the vinyl alcohol content:

The content of 1-methylvinyl alcohol and vinyl alcohol groups in the polyvinyl acetals was determined by the acetylation of the hydroxyl groups with acetic anhydride in the presence of pyridine and 4-dimethylaminopyridine.

For this purpose, 1 g±0.001 g of polyvinyl butyral was dissolved in 24 ml of pyridine and 0.04 g of 4-dimethylaminopyridine at 50° C. over a period of 2 hours. After cooling to 25° C., 10 ml of a mixture of pyridine and acetic anhydride (87/13 parts by volume) were added to the solution and the resulting solution was mixed thoroughly for 1 hour. Subsequently, 30 ml of a mixture of pyridine/water (5/1 parts by volume) were added and the resulting mixture was shaken for a further hour. The mixture was subsequently titrated with methanolic 0.5 N KOH to pH 7.

Calculation:

% by weight of (1-methyl)vinyl alcohol=$[(100 \times M_w)/2000] \times$ (ml for blank−ml for sample), where $M_w$=mean molecular weight per repeating unit of the polymer.

3. Determination of the viscosity of the polyvinyl alcohol solutions:

The determination of the viscosity of the fully saponified vinyl acetate or 1-methylvinyl acetate/vinyl acetate polymers used as starting materials was carried out by a method similar to the determination of the dynamic viscosity of the polyvinyl acetals; only 4% strength aqueous solutions were used.

4. Determination of the viscosity by means of the time taken to run out of a cup:

The measurements were carried out in accordance with DIN 53211-4 using a cup with a 4 mm orifice.

Results of the measurements of the solution viscosity of the products from the Examples and Comparative Examples:

Solution viscosity:

The solution viscosity of the polyvinyl butyral from Comparative Example 1 in 10% strength ethanolic solution was 14.24 mPas. In a solution of the polyvinyl butyral according to the invention from Example 1 the solution viscosity was drastically reduced to 8.22 mPas despite a comparable molecular weight of the polyvinyl alcohol used.

The solution viscosity of the polyvinyl butyral from Comparative Example 2 in 10% strength ethanolic solution was 116 mPas. The solution viscosity of a solution of the polyvinyl butyral from Example 2 was drastically reduced to only 62.6 mPas despite the molecular weight and the OH content of the polyvinyl alcohol used being the same.

Dependence of the viscosity on the solids content:

Solutions in ethyl acetate having solids contents of 20% by weight, 25% by weight, 30% by weight, 35% by weight and 40% by weight were prepared from each of the polyvinyl butyrals from Example 1 and Comparative Example 1 and the dependence of the viscosity on the solids content was determined in accordance with DIN 53211-4. The following results were obtained:

| Salids content (%) | 20 | 25 | 30 | 35 | 40 |
|---|---|---|---|---|---|
| Time to run out of cup, Ex. 1 (s) | 15 | 19 | 29 | 67 | 85 |
| Time to run out of cup, C. Ex. 1 (s) | 30 | 71 | 199 | * | * |

* = viscosity no longer able to be measured.

Particularly at high solids contents, the modified polyvinyl butyrals according to the invention give significantly less viscous solutions than conventional polyvinyl butyrals having the same OH number and the same molecular weight.

Use test in printing ink formulations:

The modified polyvinyl butyral from Example 1 was tested for suitability as a binder in printing ink formulations (polyvinyl butyral containing 15.8% by weight of 1-methylvinyl alcohol/vinyl alcohol units, 2.0% by weight of 1-methylvinyl acetate/vinyl acetate units, 82.2% by weight of (methyl)vinyl butyral units and having a solution viscosity in 10% strength ethanolic solution of 8.22 mPas).

As a comparison, use was made of a commercial polyvinyl butyral (Pioloform BN 18 from Wacker-Chemie GmbH) having the following characteristics:
Polyvinyl butyral having a vinyl alcohol content of 18% by weight, a vinyl acetate content of 2% by weight, a vinyl butyral content of 80% by weight and a solution viscosity in 10% strength ethanolic solution of 15.0 mPas.

To determine gloss, transparency and covering power of the prints, a printing ink having the following formulation was used:

| Constituents: | % by weight |
|---|---|
| Retardant (methoxypropanol) | 9.3 |
| Solvent (ethanol or ethyl acetate) | 74.0 |
| Binder (polyvinyl butyral) | 9.2 |
| Pigment | 7.5 |

Pigments used were:
Permanent yellow P-GRL 04 (Hoechst AG) or titanium dioxide 2065 (Kronos).

Use test methods:

1. Determination of the gloss:

To determine gloss, the printing ink was applied in a thickness (wet) of 12 μm to standard paper (APCO II/II, 150 g/m²) using a doctor blade. After drying, (24 hours at 23° C. and 50% relative atmospheric humidity), the gloss (reflectometer value) was measured in accordance with DIN 67530 using a reflectometer (Micro Tri Gloss/Byk Gardner).

2. Determination of the transparency and the covering power:

To assess the transparency and the covering power, the printing ink was applied in a thickness (wet) of 12 μm to standard paper (APCO II/II, 150 g/m²) using a doctor blade. After drying, (24 hours at 23° C. and 50% relative atmospheric humidity), a water-diluable clear varnish (based on polyacrylate) was applied in a thickness (wet) of 12 μm. After drying again (24 hours at 23° C. and 50% relative atmospheric humidity), the transparency and the covering power were assessed visually using the following evaluation scale relative to a comparison standard (st):
1=same, 2=somewhat, 3=noticeably, 4=significantly, 5=substantially,
co=more covering power, tra=more transparent.

The results of the gloss measurement, the measurement of the transparency and the determination of the covering power are summarized in Table 1:

In the formulation containing permanent yellow, gloss and transparency of the printing inks which contain the polyvinyl butyral modified according to the invention are comparable with the formulations containing conventional polyvinyl butyral.

In the formulations containing titanium oxide, the polyvinyl butyral of the invention gives significantly better gloss and improved transparency.

TABLE 1

| Polyvinyl butyral | Gloss 60° C. on white | Transparency % | Covering power, visual |
|---|---|---|---|
| Permanent yellow P-GRL 04 in ethyl acetate: | | | |
| Example 1 | 43.5 | 96.2 | 2 co |
| Pioloform BN 18 | 43.7 | 96.7 | standard |
| Titanium dioxide 2065 in ethanol: | | | |
| | black | % | visual |
| Example 1 | 32.8 | 84.2 | 2 tra |
| Pioloform BN 18 | 31.9 | 82.9 | standard |
| Titanium dioxide 2065 in ethyl acetate: | | | |
| | black | % | visual |
| Example 1 | 43.4 | 81.9 | 1 co |
| Pioloform BN 18 | 34.8 | 80.9 | standard |

The viscosity and storage stability of printing ink formulations were tested using the following, pigment-richer formulation:

| Constituents: | % by weight |
|---|---|
| Retardant (methoxypropanol) | 4.3 |
| Solvent (ethanol or ethyl acetate) | 73.0 |
| Binder (polyvinyl butyral) | 10.7 |
| Pigment (permanent yellow P-GRL 04) | 12.0 |
| | 100.0 |
| Adhesion promoter (Polymin H₂O-free) | 3.0 |

Determination of the storage stability:

The storage stability was determined by measuring the viscosity immediately after mixing the printing ink formulation and after a storage time of 7 days under standard conditions (23° C., 50% relative atmospheric humidity). The viscosity was determined by means of a rotation viscometer. The results are summarized in Table 2.

TABLE 2

| Polyvinyl butyral | Viscosity immediate (mPas) | Viscosity 7 days (mPas) |
|---|---|---|
| In ethanol: | | |
| Ex. 1 without adhesion promoter | 260 | 330 |
| Ex. 1 with 3% Polymin | 319 | 404 |
| Pioloform BN 18 without adhesion promoter | 415 | 574 |
| Pioloform BN 18 with 3% Polymin | 829 | 893 |
| In ethyl acetate: | | |
| Ex. 1 without adhesion promoter | 469 | 404 |
| Ex. 1 with 3% Polymin | 595 | 489 |
| Pioloform BN 18 without adhesion promoter | 659 | 744 |
| Pioloform BN 18 with 3% Polymin | not measurable | not measurable |

The storage stability of a printing ink formulation with and without adhesion promoter is significantly better when using the polyvinyl butyral modified according to the invention than when using a formulation containing conventional polyvinyl butyral binder.

TABLE 3

| Example | IPC (% by wt) | K value of PVOH | Viscosity of PVOH (mPas) | Molecular weight of PVOH (SEC method) $M_w$ | $M_n$ | U | Aldehyde | VOH content (% by wt) | Viscosity of PVAC (mPAs) | Molecular weight of PVAC (SEC method) $M_w$ | $M_n$ | U |
|---|---|---|---|---|---|---|---|---|---|---|---|---|
| Ex. 1 | 20 | 30.2 | 2.3 | 23000 | 9300 | 2.4 | Butyr- | 16.7 | 8.2 | 23000 | 8200 | 2.8 |
| C. Ex. 1 | 0 | 28.1 | 2.1 | 15000 | 6400 | 2.3 | Butyr- | 19.4 | 14.2 | 14300 | 5900 | 2.4 |
| C. Ex. 3 | 0 | 31.1 | 2.5 | 26000 | 10800 | 2.4 | Butyr- | 18.4 | 18.9 | 25700 | 10000 | 2.6 |
| Ex. 2 | 10 | 45.6 | 5.5 | 74000 | 23700 | 3.1 | Butyr- | 17.4 | 62.6 | | | |
| C. Ex. 2 | 0 | 44.1 | 5.5 | 71000 | 23000 | 3.1 | Butyr- | 17.6 | 116.0 | | | |
| Ex. 3 | 20 | | 2.3 | 23000 | 9300 | 2.4 | Acet- | 10.9 | 12.0 | | | |
| C. Ex. 4 | 0 | | 2.5 | 26000 | 10800 | 2.4 | Acet- | 11.2 | 22.6 | | | |
| Ex. 4 | 20 | | 2.3 | 23000 | 9300 | 2.4 | Propion- | 18.0 | 10.0 | | | |
| C. Ex. 5 | 0 | | 2.5 | 26000 | 10800 | 2.4 | Propion- | 19.3 | 15.9 | | | |
| Ex. 5 | 10 | 28.6 | 2.2 | | | | Butyr- | 16.1 | 7.7 | | | |
| Ex. 6 | 30 | 30.0 | 2.3 | | | | Butyr- | 15.1 | 9.6 | | | |
| Ex. 7 | 20 | | 2.3 | | | | Butyr- | 12.6 | 8.3 | | | |
| Ex. 8 | 20 | | 2.3 | | | | Butyr- | 13.8 | 8.6 | | | |
| Ex. 9 | 20 | | 2.3 | | | | Butyr- | 14.4 | 7.8 | | | |
| Ex. 10 | 20 | | 2.3 | | | | Butyr- | 15.3 | 8.3 | | | |
| Ex. 11 | 20 | | 2.3 | | | | Butyr- | 17.1 | 9.2 | | | |
| Ex. 12 | 20 | | 2.3 | | | | Butyr- | 18.8 | 9.3 | | | |

IPS (% by weight): proportion of 1-methylvinyl acetate/alcohol units
K value of PVOH: Fikentscher K value (viscometric determination) of the 1-methylvinyl alcohol/vinyl alcohol copolymer or polyvinyl alcohol
Viscosity of PVOH: viscosity of the 1-methylvinyl alcohol/vinyl alcohol copolymer or the polyvinyl alcohol in 4% strength aqueous solution by the Höppler method
Molecular weight of PVOH: molecular weight of the 1-methylvinyl alcohol/vinyl alcohol copolymer silylated with bistrimethylsilylacetamide or the polyvinyl alcohol, determined by means of SEC (size exclusion chromatography) relative to a polystyrene standard, as weight average $M_w$, number average M and non uniformity U.
VOH content: 1-methylvinyl alcohol/vinyl alcohol content of the polyvinyl acetal
Viscosity of PVAC: viscosity of the polyvinyl acetal in 10% strength ethanolic solution by the Höppler method
Molecular weight of PVAC: molecular weight of the polyvinyl acetal determined by means of SEC (size exclusion chromatography) relative to a polystyrene standard, as weight average $M_w$, number average $M_n$ and non uniformity U.

Comparing the results of Example 1 with those of Comparative Example 3 shows that the acetalization with butyraldehyde of 1-methylvinyl alcohol/vinyl alcohol copolymers and polyvinyl alcohol having the same molecular weight, the same K value and the same viscosity of the vinyl alcohol polymers using the procedure according to the invention gives polyvinyl butyrals which, at the same molecular weight, have a significantly reduced solution viscosity.

Comparing Example 3 with Comparative Example 4 and comparing Example 4 with Comparative Example 5 shows that this also applies to acetalization using acetaldehyde and propionaldehyde.

In Examples 7 to 12, different amounts of butyraldehyde were used for the acetalization. The results show that in the case of the polyvinyl acetals claimed the solution viscosity is independent of the vinyl alcohol content over a wide range.

What is claimed is:

1. A modified polyvinyl acetal obtained by saponification of a 1-alkylvinyl acetate-vinyl acetate copolymer which comprises 1-alkylvinyl acetate/vinyl acetate in a weight ratio of from 1/99 to 40/60 and subsequent acetalization of the saponification product comprising at least 80% by weight of vinyl alcohol and 1-alkylvinyl alcohol units with one or more aliphatic aldehydes having from 1 to 6 carbon atoms in the presence of an acid catalyst in an aqueous and/or organic medium.

2. A modified polyvinyl acetal as claimed in claim 1 which comprises
   a) 50–89.5% by weight of vinyl acetal units

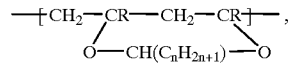

b) 10–30% by weight of vinyl alcohol units —[—$CH_2$—CR(OH)—]—,
   c) 0.5–20% by weight of vinyl acetate units —[—$CH_2$—CR($OCOCH_3$)—]—,
where R is H or a $C_1$–$C_4$-alkyl radical and n is from 0 to 5 and the vinyl alcohol units b) and the vinyl acetate units c) comprise 1-alkylvinyl alcohol/vinyl alcohol and 1-alkylvinyl acetate/vinyl acetate in a weight ratio of from 1/99 to 40/60 in each case.

3. A modified polyvinyl acetal as claimed in claim 1 having a viscosity (DIN 53015; Höppler method; 10% strength solution in ethanol) of from 6 to 14 mPas.

4. A process for preparing modified polyvinyl acetals which comprises saponifying 1-alkylvinyl acetate-vinyl acetate copolymers comprised of 1-alkylvinyl acetate/vinyl acetate in a weight ratio of from 1/99 to 40/60, to form a partially or fully saponified 1-alkylvinyl acetate-vinyl acetate copolymer comprising at least 80% by weight of vinyl alcohol and 1-alkylvinyl alcohol units and acetalizing the partially or fully saponified alkylvinyl acetate-vinyl acetate copolymer with one or more aliphatic aldehydes having from 1 to 6 carbon atoms in the presence of an acid catalyst in an aqueous and/or organic medium.

5. The process as claimed in claim 4, wherein the partially or fully saponified 1-alkylvinyl acetate-vinyl acetate copolymers have a viscosity (DIN 53015; Höppler method; 4% strength aqueous solution) of from 1 to 30 mPas.

6. A printing ink composition comprised of from 5 to 20% by weight of pigment, from 5 to 15% by weight of the modified polyvinyl acetal as claimed in claim 1 and a solvent, said contents being based on the total weight of the composition.

7. The printing ink composition of claim 6 which further contains printing ink additives.

8. Anticorrosion compositions which contain, as a binder, the modified polyvinyl acetal of claim 1.

9. Ceramic green bodies which contain, as a binder, the modified polyvinyl acetal of claim 1.

10. Ceramic and metal powders for injection moldings which contains, as a binder, the modified polyvinyl acetal of claim 1.

11. A coating composition for the internal coating of cans which contains as a binder the modified polyvinyl acetal of claim 1.

12. The coating composition of claim 11 which further contains epoxy resins as crosslinkers.

* * * * *